United States Patent
Liberty et al.

(10) Patent No.: US 10,620,726 B2
(45) Date of Patent: Apr. 14, 2020

(54) 3D POINTER MAPPING

(71) Applicant: IDHL Holdings, Inc., Wilmington, DE (US)

(72) Inventors: Matthew G. Liberty, Olney, MD (US); Bryan A. Cook, Silver Spring, MD (US); Hua Sheng, Asbury, NJ (US)

(73) Assignee: IDHL Holdings, Inc., Wilmington, DE (US)

( * ) Notice: Subject to any disclaimer, the term of this patent is extended or adjusted under 35 U.S.C. 154(b) by 0 days.

(21) Appl. No.: 16/010,145

(22) Filed: Jun. 15, 2018

(65) Prior Publication Data

US 2018/0307334 A1   Oct. 25, 2018

Related U.S. Application Data

(63) Continuation of application No. 13/000,889, filed as application No. PCT/US2009/049411 on Jul. 1, 2009, now abandoned.

(60) Provisional application No. 61/077,238, filed on Jul. 1, 2008.

(51) Int. Cl.
   *G06F 3/038* (2013.01)
   *G06F 3/0346* (2013.01)

(52) U.S. Cl.
   CPC .......... *G06F 3/0383* (2013.01); *G06F 3/0346* (2013.01)

(58) Field of Classification Search
   CPC ....... G06F 3/0383; G06F 3/0346; G06F 3/038
   USPC ....................................................... 345/158
   See application file for complete search history.

(56) References Cited

U.S. PATENT DOCUMENTS

| | | | |
|---|---|---|---|
| 3,931,747 A | 1/1976 | Erspamer | |
| 4,160,973 A | 7/1979 | Berlin | |
| 4,686,772 A | 8/1987 | Sobel | |
| 4,787,051 A | 11/1988 | Olson | |
| 5,181,181 A | 1/1993 | Glynn | |
| 5,396,265 A | 3/1995 | Ulrich et al. | |
| 5,440,326 A | 8/1995 | Quinn | |
| 5,453,758 A | 9/1995 | Sato | |
| 5,554,980 A | 9/1996 | Hashimoto et al. | |
| 5,598,187 A | 1/1997 | Ide et al. | |
| 5,627,565 A * | 5/1997 | Morishita | G01S 3/783 345/157 |
| 5,825,350 A | 10/1998 | Case et al. | |
| 5,902,968 A | 5/1999 | Sato et al. | |

(Continued)

FOREIGN PATENT DOCUMENTS

GB   591019 A   8/1947
JP   2006031709 A   2/2006

(Continued)

OTHER PUBLICATIONS

Decision of Rejection, Japanese Patent Application No. 2011-516853, dated May 1, 2015, 5 pages.

(Continued)

*Primary Examiner* — Benyam Ketema
(74) *Attorney, Agent, or Firm* — Julian F. Santos

(57) ABSTRACT

Systems, devices, methods and software are described for mapping movement or motion of a 3D pointing device into cursor position; e.g., for use in rendering the cursor on a display. Absolute and relative type mapping algorithms are described. Mapping algorithms can be combined to obtain beneficial characteristics from different types of mapping.

20 Claims, 10 Drawing Sheets

(56) References Cited

U.S. PATENT DOCUMENTS

| | | | |
|---|---|---|---|
| 6,069,594 A | 5/2000 | Barnes et al. | |
| 6,110,039 A * | 8/2000 | Oh | A63F 13/04 463/2 |
| 6,252,579 B1 | 6/2001 | Rosenberg et al. | |
| 6,292,174 B1 | 9/2001 | Mallett et al. | |
| 6,369,794 B1 | 4/2002 | Sakurai et al. | |
| 6,501,515 B1 | 12/2002 | Iwamura | |
| 6,983,336 B2 | 1/2006 | Kikuchi et al. | |
| 7,656,395 B2 | 2/2010 | Pope et al. | |
| 7,716,008 B2 * | 5/2010 | Ohta | A63F 13/10 702/152 |
| 7,774,155 B2 * | 8/2010 | Sato | A63F 13/06 702/127 |
| 7,860,676 B2 | 12/2010 | Sheng et al. | |
| 8,303,411 B2 * | 11/2012 | Marks | A63F 13/02 463/36 |
| 2002/0085097 A1 * | 7/2002 | Colmenarez | G06F 3/0304 348/211.4 |
| 2002/0140745 A1 | 10/2002 | Ellenby et al. | |
| 2003/0107551 A1 * | 6/2003 | Dunker | G06F 3/0312 345/158 |
| 2004/0070564 A1 * | 4/2004 | Dawson | G06F 3/0325 345/156 |
| 2004/0075650 A1 | 4/2004 | Paul et al. | |
| 2004/0095317 A1 * | 5/2004 | Zhang | G06F 3/0346 345/158 |
| 2004/0123001 A1 | 6/2004 | Kikuchi et al. | |
| 2004/0268393 A1 | 12/2004 | Hunleth et al. | |
| 2005/0174324 A1 * | 8/2005 | Liberty | G06F 3/017 345/156 |
| 2005/0212767 A1 * | 9/2005 | Marvit | G06F 1/1626 345/158 |
| 2005/0243061 A1 * | 11/2005 | Liberty | A61B 5/1171 345/158 |
| 2005/0243062 A1 * | 11/2005 | Liberty | G06F 3/017 345/158 |
| 2005/0253806 A1 * | 11/2005 | Liberty | G06F 1/3215 345/156 |
| 2006/0012562 A1 | 1/2006 | Pope et al. | |
| 2006/0033713 A1 | 2/2006 | Pryor | |
| 2006/0092133 A1 * | 5/2006 | Touma | G06F 3/0346 345/158 |
| 2006/0152489 A1 | 7/2006 | Sweetser et al. | |
| 2006/0178212 A1 * | 8/2006 | Penzias | A63F 13/211 463/37 |
| 2006/0262116 A1 * | 11/2006 | Moshiri | G06F 3/0346 345/419 |
| 2006/0277571 A1 | 12/2006 | Marks et al. | |
| 2007/0035518 A1 * | 2/2007 | Francz | G06F 3/0346 345/163 |
| 2007/0176899 A1 * | 8/2007 | Yoo | G06F 3/03542 345/158 |
| 2007/0257885 A1 | 11/2007 | Liberty | |
| 2008/0070684 A1 | 3/2008 | Haigh-Hutchinson | |
| 2008/0106517 A1 * | 5/2008 | Kerr | G06F 3/0304 345/158 |
| 2008/0129688 A1 | 6/2008 | Richardson et al. | |
| 2008/0278445 A1 * | 11/2008 | Sweetser | G06F 3/0325 345/158 |
| 2009/0153389 A1 | 6/2009 | Kerr et al. | |
| 2009/0259432 A1 * | 10/2009 | Liberty | G01S 1/70 702/150 |
| 2010/0103095 A1 * | 4/2010 | Yamamoto | G06F 3/0346 345/156 |
| 2011/0102321 A1 * | 5/2011 | Son | G06F 3/0346 345/158 |
| 2012/0038549 A1 * | 2/2012 | Mandella | G06F 3/011 345/156 |
| 2012/0194428 A1 * | 8/2012 | Kwon | G06F 3/0482 345/157 |
| 2012/0206380 A1 * | 8/2012 | Zhao | G06F 3/04883 345/173 |
| 2013/0127715 A1 * | 5/2013 | Simpkins | G06F 3/0304 345/158 |
| 2013/0151195 A1 * | 6/2013 | Marinoni | G01B 7/30 702/151 |

FOREIGN PATENT DOCUMENTS

| | | |
|---|---|---|
| JP | 2006137077 A | 6/2006 |
| JP | 2007509448 A | 4/2007 |

OTHER PUBLICATIONS

Notice of Final Rejection (English Translation), Korean Patent Application No. 10-2011-7002668, dated Jan. 28, 2016, 8 pges.
Analog Devices, Inc.,Low-Cost +/−2g/+/− 10g Dual Axis iMEMS Accelerometers with Digital Output, ADXL202/ADXL210 Product Specification, 1999, 11 pages.
W. T. Ang et al.,Design of All-Accelerometer Inertial Measurement Unit for Tremor Sensing in Hand Held Microsurgical Instrument, Institute for Software Research, Jan. 1, 2003, 7 pages.
Non-Final Office Action, U.S. Appl. No. 13/000,889, dated Sep. 21, 2017, 23 pages.
Notice of Preliminary Rejection, Korean Patent Application No. 10-2014-7018229, dated Jul. 16, 2015, 8 pages.
Third Office Action, Chinese Patent Application No. 200980128320.2, dated Nov. 8, 2016, 23.
M. Caruso,Application of Magnetoresistive Sensors in Navigation Systems, SAE Technical Paper Series 970602, 1997, 9 pages.
Notice of Final Rejection, Korean Patent Application No. 10-2011-7002668, dated Jan. 28, 2016, 25 pages.
Notice of Rejection, Japanese Patent Application No. 2011-516853, dated Aug. 18, 2014, 5 pges.
English Language Abstract, JP-2006-137077, dated Jun. 1, 2006, 1 page.
Notice of Preliminary Rejection (English Translation), Korean Patent Application No. 10-2014-7018229, dated Jul. 16, 2015, 5 pages.
Supplementary European Search Report, European Patent Application No. 09774447.8, dated Mar. 28, 2014, 15 pages.
Written Opinion of the International Searching Authority, International Patent Application No. PCT/US09/49411, dated Sep. 1, 2009, 9 pages.
Stmicroelectronics,LIS3L02AS: Inertial Sensor: 3-Axis-2g/6g Linear Accelerometer, Feb. 2003, 7 pages.
Decision of Rejection (English Translation), Japanese Patent Application No. 2011-516853, dated May 1, 2015, 3 pages.
International Search Report, International Patent Application No. PCT/US09/49411, dated Sep. 1, 2009, 5 pages.
Notice of Preliminary Rejection, Korean Patent Application No. 10-2011-7002668, dated Jul. 16, 2015, 7 pges.
Notice of Rejection (English Translation), Japanese Patent Application No. 2011-516853, dated Aug. 18, 2014, 5 pages.
Office Action, Chinese Patent Application No. 200980128320.2, dated Jul. 4, 2013, 10 pages.
Translation letter of Chinese Office Action, Chinese Patent Application No. 200980128320.2, dated Nov. 29, 2016, 3 pages.
Communication pursuant to Article 94(3) EPC, European Patent Application No. 09 774 447.8, dated Jan. 10, 2017, 11 pages.
Extended European Search Report, European Patent Application No. 09774447.8, dated Mar. 11, 2014, 3 pages.
Notice of Preliminary Rejection (English Translation), Korean Patent Application No. 10-2011-7002668, dated Jul. 16, 2015, 2 pages.

\* cited by examiner

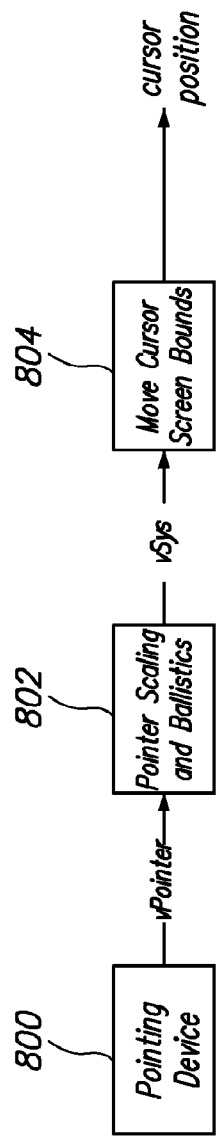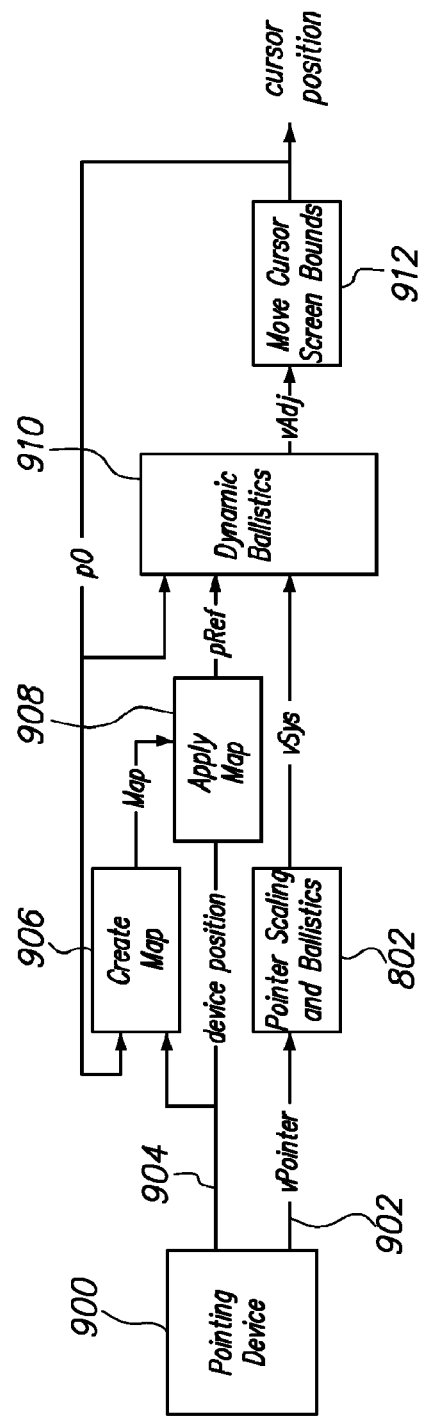

3D POINTER MAPPING

RELATED APPLICATION

This application is a continuation application of U.S. patent application Ser. No. 13/000,889, filed Mar. 9, 2011, which is a § 371 of International Application No. PCT/US09/049411, filed Jul. 1, 2009, which claims the benefit of U.S. Provisional Application No. 61/077,238, filed Jul. 1, 2008; the contents of each of which are incorporated herein by reference.

BACKGROUND

The present invention describes mapping techniques, systems, software and devices, which can be used in 3D pointing devices, as well as in other types of devices.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of separate components. An example of this trend is the combination television/VCR/DVD in which three previously independent components are frequently sold today as an integrated unit. This trend is likely to continue with an end result that potentially all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the display interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and display interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications and systems. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices. The phrase "3D pointing" is used in this specification to refer to the ability of an input device to measure motion in three dimensional space. Three dimensional space has six degrees of freedom (6DOF): three axes of linear motion and three axes of angular motion. Although the term 6DOF is commonly used, the seventh dimension of time is automatically included. The position (or pose) of a device may be represented by its linear position and angular position (orientation). The 3D pointing device moves within the six degrees of freedom in the air in front of, e.g., a display, and the corresponding ability of the user interface to translate those motions directly into user interface commands, e.g., movement of a cursor on the display. Thus "3D pointing" differs from, e.g., conventional computer mouse pointing techniques which use a surface, e.g., a desk surface or mousepad, as a proxy surface from which relative movement of the mouse is translated into cursor movement on the computer display. An example of a 3D pointing device can be found in U.S. Pat. No. 7,118,518 to Matthew G. Liberty (hereafter referred to as the '518 patent), the disclosure of which is incorporated here by reference. The motion data is transferred between the 3D pointing device and the host system. The motion data transfer may be performed by any communication link including wired, radio frequency, ultrasonic and infrared.

Two primary methods exist for mapping device motion into cursor motion: absolute pointing and relative pointing. With absolute pointing, the desired cursor location is the location where the forward vector of the device intersects the plane of the display. If the 3D pointer were a laser pointer, this cursor location would be the location of the projected laser dot. With absolute pointing, the pointing resolution for angular motions varies with linear position. The further the user is from the display, the finer the angular motion required to target objects. The angular motion resolution also varies with the off-axis angle. When the user is to the side of the display, smaller angular motions are required than when the user is at the same distance directly in front of the display. This variation in pointing resolution yields an inconsistent user experience. When part of a TV remote control, this variation causes inconsistent behavior between homes and even between seats at the same home. Absolute pointing is, however, normally repeatable and time invariant. If the 3D pointer is placed in the same position, then the cursor will return to the same position. Absolute pointing may also be non-calibrated and referenced to an initial starting position.

With relative pointing, the pointing resolution for all motion is independent of linear position and angular position from the display. However, the device may not be aligned with the cursor on the display. Relative pointing allows for non-linear processing including pointer ballistics which can dramatically improve pointing performance. Pointer ballistics are described, for example, at http://www.microsoft.com/whdc/archive/pointer-bal.mspx. Relative pointing often bounds cursor motion to the display bounds and discards any motion beyond the display bounds. While this allows users to relax and find a comfortable position, some applications benefit from a fixed mapping between device position and cursor location.

However, solutions exist beyond pure absolute pointing and pure relative pointing. Accordingly, there is still room for improvement in the area of mapping of, e.g., device movement to display, handheld device design, generally, and 3D pointer design, more specifically. For the remainder of this specification, absolute pointing refers to solutions that have characteristics most similar to true absolute pointing and relative pointing refers to solutions that have characteristics most similar to true relative pointing.

SUMMARY

According to one exemplary embodiment, a method for mapping a device's movement into cursor position is described. The device's linear position and angular position are estimated. The estimated linear position and angular position are further processed using both a first mapping algorithm to generate a first cursor location, and a second mapping algorithm to generate a second cursor location. The first cursor location and the second cursor location are combined to generate a final cursor output. Such a technique can be used, for example, to combine the strengths of the two mapping algorithms to provide a more robust user experience associated with, e.g., a user interface in which the cursor is used to interact with various objects.

According to another exemplary embodiment, a 3D pointing device includes at least one sensor configured to generate an output which is associated with movement of the 3D pointing device and a processor. The processor is configured to estimate the device's linear position and angular position using the output, to process the estimated linear position and angular position using both a first mapping algorithm to generate a first cursor location and a second mapping algorithm to generate a second cursor location, and to combine the first cursor location and the second cursor location to generate a final cursor output.

According to another exemplary embodiment, a system includes a 3D pointing device having at least one sensor configured to generate an output which is associated with movement of said 3D pointing device and a system controller in communication with the 3D pointing device and configured to receive data associated with said output therefrom. At least one of the 3D pointing device and the system controller include a processor for estimating at least one of said device's linear position and angular position using the output, to process at least one of the estimated linear position and angular position using both a first mapping algorithm to generate a first cursor location and a second mapping algorithm to generate a second cursor location, and to combine the first cursor location and the second cursor location to generate a final cursor output.

According to another exemplary embodiment, a method for mapping a device's movement into cursor position includes estimating the device's linear position and angular position, and processing the estimated linear position and angular position using a mapping algorithm to generate a cursor location, wherein the mapping algorithm is an absolute invariant algorithm which has a first characteristic of providing a direct, repeatable mapping from device linear position and angular position into cursor location and a second characteristic that cursor responsiveness to linear motion and angular motion is consistent over a motion range.

According to another exemplary embodiment, a method for mapping a device's movement into cursor position includes the steps of estimating at least one of the device's linear position and angular position, and processing at least one of the estimated linear position and angular position using a mapping algorithm to generate a cursor location, wherein the mapping algorithm creates an intermediate, virtual display that moves to face the device.

According to another exemplary embodiment, a method for mapping a device's movement into cursor position, includes the steps of estimating the device's angular position, and processing the estimated angular position using a mapping algorithm to generate a cursor location, wherein the mapping algorithm maps said estimated angular position of the device into cursor coordinates using an angular position spherical projection.

BRIEF DESCRIPTION OF THE DRAWINGS

The accompanying drawings illustrate exemplary embodiments, wherein:

FIGS. 8-12 illustrate functions associated with mapping of device motion into displayed cursor motion according to exemplary embodiments.

DETAILED DESCRIPTION

Figure 1:
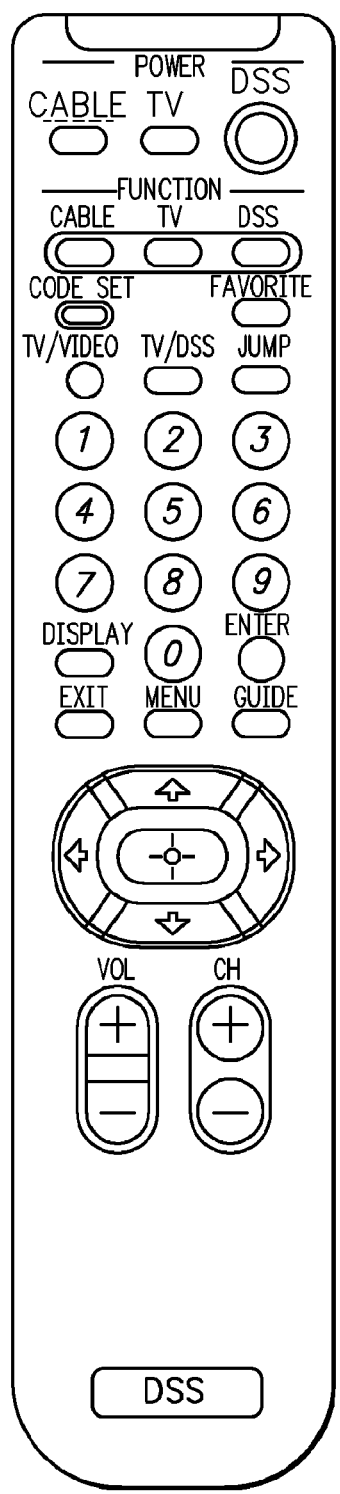
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and to display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
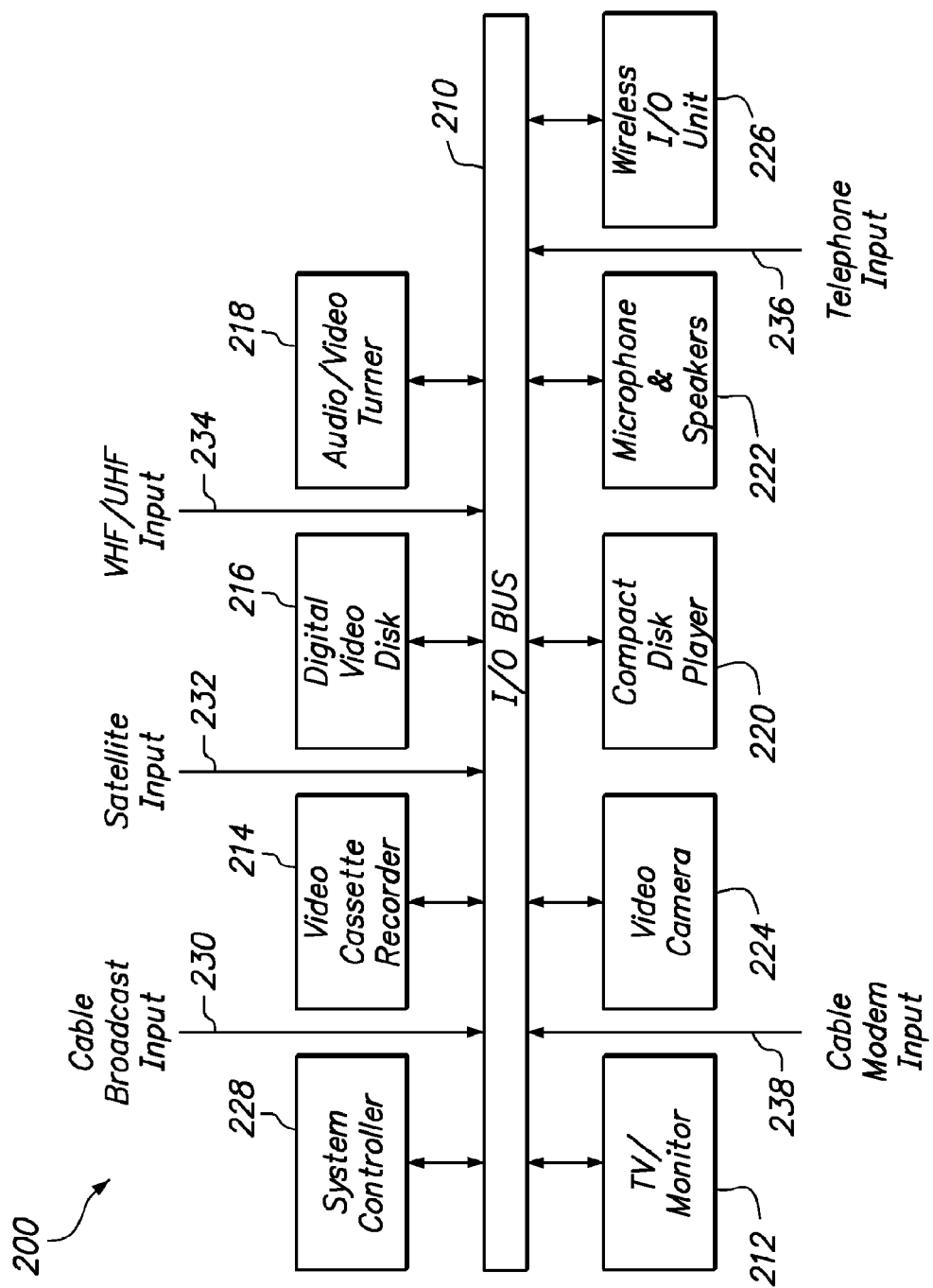
FIG. 2 depicts an exemplary media system in which exemplary embodiments can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. patent application "A Control Framework with a Zoomable Graphical User Interface for Organizing, Selecting and Launching Media Items". Alternatively, remote devices in accordance with the present invention can be used in conjunction with other systems, for example computer systems including, e.g., a display, a processor and a memory system or with various other systems and applications.

Figure 3:
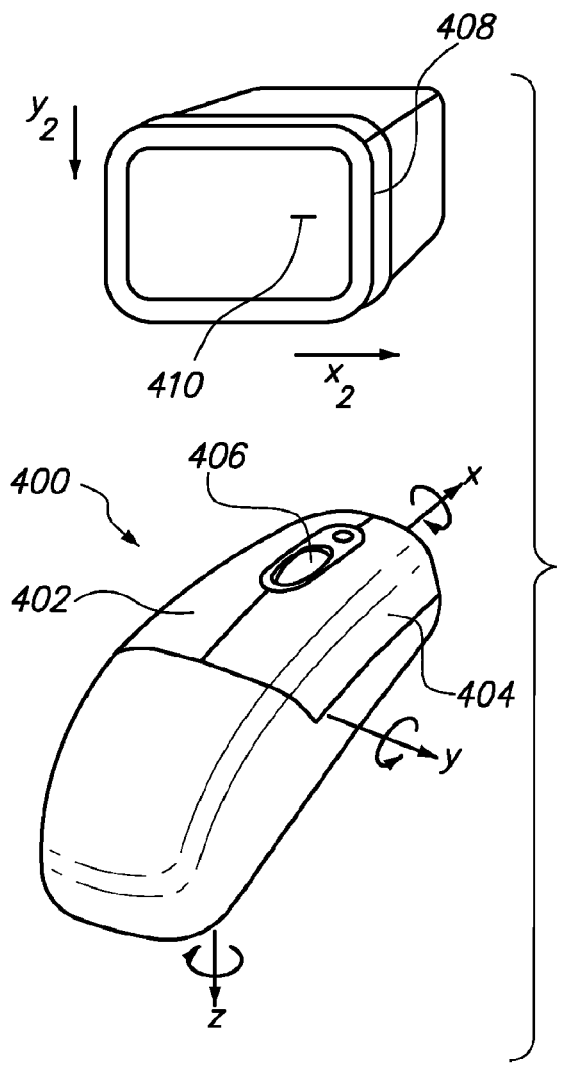
FIG. 3 shows a 3D pointing device according to an exemplary embodiment of the present invention.

As mentioned in the Background section, remote devices which operate as 3D pointers are of particular interest for the present specification. Such devices enable the translation of movement, e.g., gestures, into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some exemplary embodiments of the present invention can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406, although other exemplary embodiments will include other physical configurations. According to exemplary embodiments of the present invention, it is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the $y_2$ axis of the display 408. Likewise, rotation of the 3D pointing device 408 about the z-axis can be sensed by the 3D pointing device 400 and translated into an output usable by the system to move cursor 410 along the $x_2$ axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
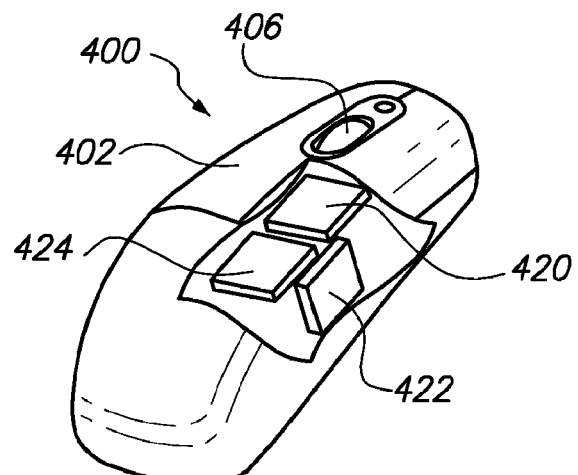
FIG. 4 illustrates a cutaway view of the 3D pointing device in FIG. 4 including angular velocity sensing and linear acceleration sensing.

According to one purely illustrative exemplary embodiment of the present invention, two axes of angular velocity sensing 420 and 422 and three axes of linear acceleration sensing 424 can be employed as sensors in 3D pointing device 400 as shown in FIG. 4. Although this exemplary embodiment employs inertial sensors it will be appreciated that the present invention is not so limited and examples of other types of sensors which can be used in conjunction with other exemplary embodiments are provided below. The rotational sensors 420, 422 can, for example, be implemented using IDG-500 or IXZ-500 sensors made by Invensense. Alternatively, the embodiment could measure all three axes of angular velocity using elements 420 and 422 implemented as the combination of an IDG-500 and ISZ-500. It will be appreciated by those skilled in the art that other types of rotational sensors can be employed as rotational sensors 420 and 422 and that the Invensense sensors are purely used as an illustrative example. Unlike traditional gyroscopes, these rotational sensors use MEMS technology to provide a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. Other sensors/sensor packages may also be used, and the angular velocity sensors 420, 422 can be 1-D, 2-D or 3-D sensors. The accelerometer 424 can, for example, be a 3-axis linear accelerometer such as the LIS331DLH produced by STMicroelectronics. However, a 2-axis linear accelerometer could be used by assuming that the device is measuring gravity and mathematically computing the remaining $3^{rd}$ value. Additionally, the accelerometer(s) and rotational sensor(s) could be packaged together into a single sensor package. Other variations of sensors and sensor packages may also be used in conjunction with these exemplary embodiments.

Figure 5:
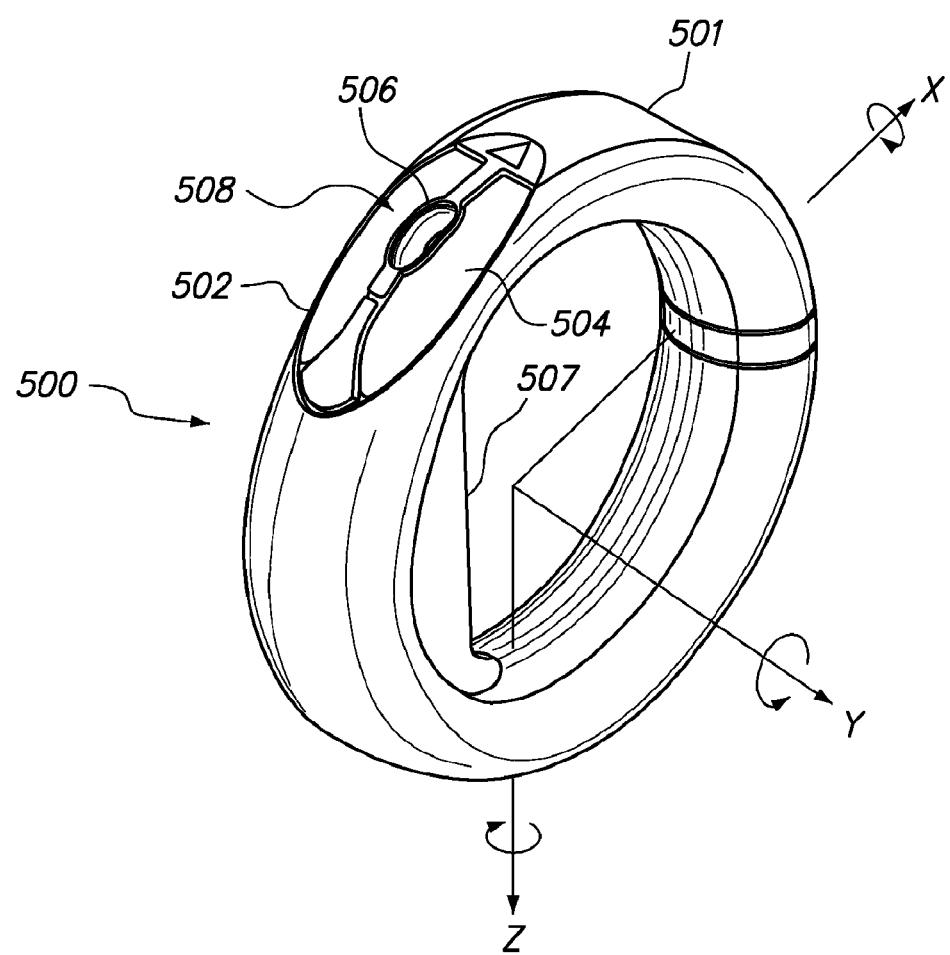
FIG. 5 shows a 3D pointing device according to another exemplary embodiment.

The exemplary embodiments are not limited to the industrial design illustrated in FIGS. 3 and 4, but can instead be deployed in any industrial form factor, another example of which is illustrated as FIG. 5. In the exemplary embodiment of FIG. 5, the 3D pointing device 500 includes a ring-shaped housing 501, two buttons 502 and 504 as well as a scroll wheel 506 and grip 507, although other exemplary embodiments may include other physical configurations. The region 508 which includes the two buttons 502 and 504 and scroll wheel 506 is referred to herein as the "control area" 508, which is disposed on an outer portion of the ring-shaped housing 501. More details regarding this exemplary embodiment can be found in U.S. patent application Ser. No. 11/480,662, entitled "3D Pointing Devices", filed on Jul. 3, 2006, the disclosure of which is incorporated here by reference.

Figure 6:
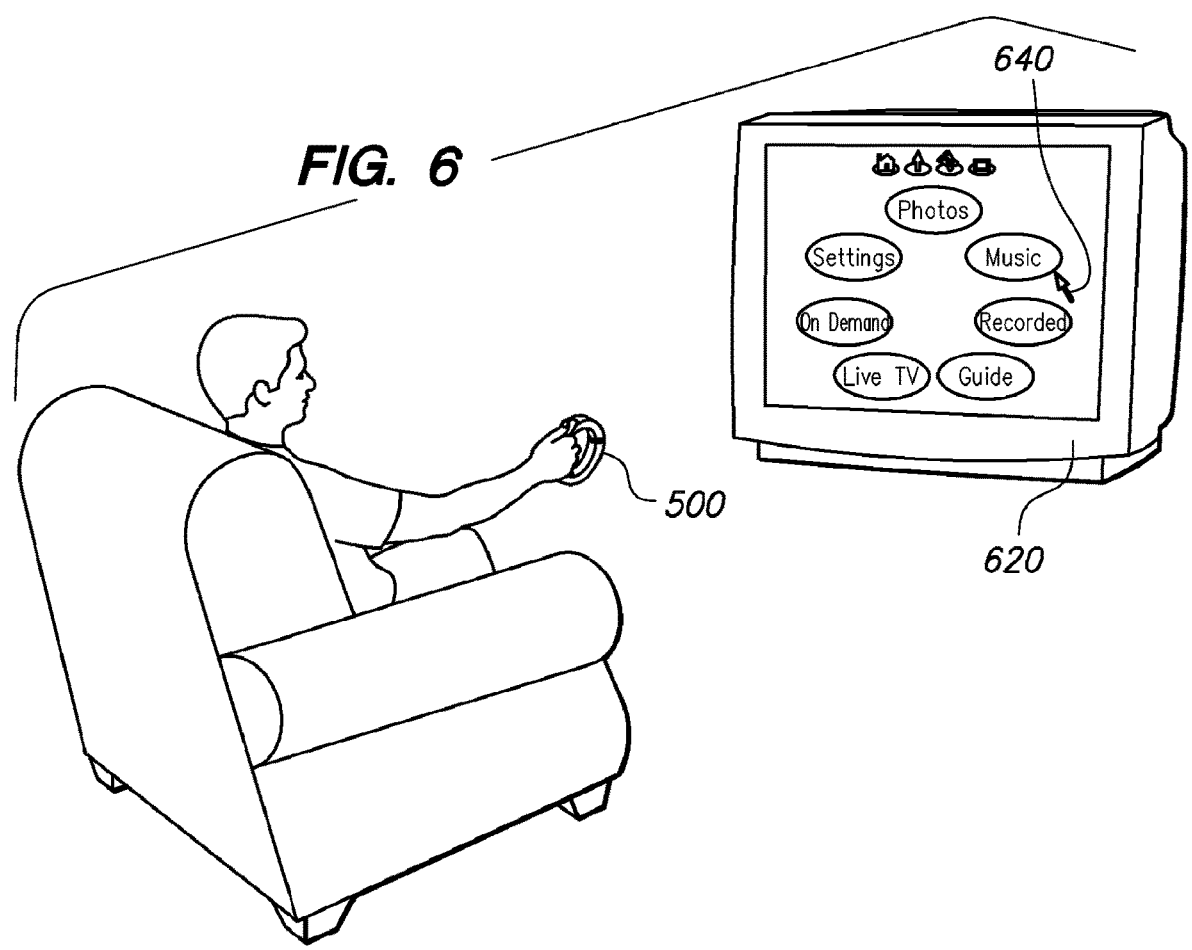
FIG. 6 depicts the 3D pointing device of FIG. 5 being used as part of a "10 foot" interface according to an exemplary embodiment.

Such devices have numerous applications including, for example, usage in the so-called "10 foot" interface between a sofa and a television in the typical living room as shown in FIG. 6. Therein, as the 3D pointing device 500 moves between different positions, that movement is detected by one or more sensors within 3D pointing device 200 and transmitted to the television 620 (or associated system component, e.g., a set-top box (not shown)). Movement of the 3D pointing device 500 can, for example, be translated or mapped into movement of a cursor 640 displayed on the television 620 (examples of such mappings being provided below) and which is used to interact with a user interface. Details of an exemplary user interface with which the user can interact via 3D pointing device 500 can be found, for example, in the above-incorporated U.S. patent application Ser. No. 10/768,432 as well as U.S. patent application Ser. No. 11/437,215, entitled "Global Navigation Objects in User Interfaces", filed on May 19, 2006, the disclosure of which is incorporated here by reference. Another exemplary embodiment may contain other sensors including the sensing system which can be found in U.S. patent application Ser. No. 12/424,090 entitled "Tracking Determination Based On Intensity Angular Gradient Of A Wave", filed on Apr. 15, 2009, the disclosure of which is incorporated here by reference.

One challenge faced in implementing exemplary 3D pointing devices 400 in accordance with these exemplary embodiments is to employ components, e.g., rotational sensors 502 and 504, which are not too costly, while at the same time providing a high degree of correlation between movement of the 3D pointing device 400, a user's expectation regarding how the user interface will react to that particular movement of the 3D pointing device and actual user interface performance in response to that movement. For example, if the 3D pointing device 400 is not moving, the user will likely expect that the cursor ought not to be drifting across the display. Likewise, if the user rotates the 3D pointing device 400 purely around the y-axis, she or he would likely not expect to see the resulting cursor movement on display 408 contain any significant x-axis component. To achieve these, and other, aspects of exemplary embodiments of the present invention, various measurements and calculations are performed, e.g., by the handheld device 400, which are used to adjust the outputs of one or more of the sensors 420, 422 and 424 and/or as part of the input used by a processor to determine an appropriate output for the user interface based on the outputs of the sensors 420, 422 and 424. These measurements and calculations are used to compensate for factors which fall broadly into two categories: (1) factors which are intrinsic to the 3D pointing device 400, e.g., errors associated with the particular sensors 420, 422 and 424 used in the device 400 or the way in which the sensors are mounted in the device 400 and (2) factors which are not intrinsic to the 3D pointing device 400, but are instead associated with the manner in which a user is using the 3D pointing device 400, e.g., linear acceleration, tilt and tremor. Some exemplary techniques for handling these effects are described in the above-incorporated by reference '518 patent. However, additional techniques for handling the bias or offset error contributions to sensed motion are described in U.S. patent application Ser. No. 12/163,229 filed on Jun. 27, 2008, entitled "Real-Time Dynamic Tracking Of Bias", the disclosure of which is incorporated here by reference.

Mapping

As mentioned above, a 3D pointing device that a user moves in 6 degrees of freedom can be used to convert that motion into cursor motion. Different applications have different demands and requirements on how the device motion should be mapped into cursor motion. These exemplary embodiments describe novel methods for mapping the device motion into cursor motion which provide improved 3D pointer performance and are configurable to deliver optimal response for each application. Among other things, exemplary embodiments of the present invention describe new 3D pointer mapping methods and a method for combining alternate mapping methods to provide optimal response for a given application. These can, for example, reduce cursor resolution variation as a function of the user's position relative to the display, which is a primary problem with absolute pointing. At the same time, the exemplary embodiments can provide a constant mapping between the device position and cursor position, which can be a problem for some relative pointing applications.

One exemplary embodiment includes:
1. A device that measures motion in 6 degrees of freedom
2. One or more algorithms that convert the device motion into cursor motion
3. A method that combines the cursor motion outputs from the algorithms
4. A visual display that displays the cursor In the exemplary embodiment shown in FIG. 7, a user holds the device 701 and makes motions to control the cursor 703 which appears on display 702. The device 701 typically contains a collection of sensors, examples of which were described above. The sensing system may consist of one or more sensors including linear accelerometers, angular position sensors (traditional gyroscopes), angular velocity sensors (MEMS gyroscopes), magnetometers, cameras, optical, ultrasonic and RF. The sensing system processes the sensor data to provide an estimate of the device's linear position and angular position. The device's position is then processed by one or more mapping algorithms to yield cursor locations. The cursor locations are then combined to produce a final cursor output. The cursor motion information then drives the cursor on the display 702. The device 701 may be connected via either wires or wirelessly to the display 702. The algorithm may run on the device 701, the display 702 or an intermediate processing unit (not shown in FIG. 7, e.g., a system console connected to both the device 701 and the display 702).

According to one exemplary embodiment, the device 701 is a battery-powered, handheld device which contains a 3-axis accelerometer and a 3-axis gyroscope, however it will be appreciated that fewer or other sensors may be included. According to this exemplary embodiment, the device 701 processes the sensor data to estimate its linear position and angular position and further processes the linear position and angular position to produce the cursor motion data. The cursor motion data is communicated to a set-top box, e.g., represented by system controller 228 in FIG. 2, over a proprietary 2.4 GHz RF link. The data is received by the RF hardware in the set-top box and communicated over a USB bus to the main set-top box processor. The main set-top box processor moves the cursor as specified, in this example, by the device 701. At 30 Hz or 60 Hz for NTSC (25 Hz or 50 Hz for PAL), the set-top box renders the image and sends the image to the display over, e.g., HDMI, component, S-Video, and/or composite outputs. The display receives the image and displays the image to the user. As mentioned earlier, although the various processing stages are performed in the handheld device 701 according to this exemplary embodiment, the set-top box or other controller which communicates with the handheld device 701 could perform some or all of the processing, e.g., the estimation of linear position and angular position and/or the mapping of the estimated linear position and angular position into one or more cursor locations.

Prior to discussing the mapping techniques which can be employed according to exemplary embodiments, some mathematical notation is introduced below to guide the discussion:

Lower case letters represent scalar variables: $x$, $y$, $z$;
Lower case bold letters represent vectors: x, y, z;

Upper case bold letters represent matrices: X, Y, Z;
Vectors are assumed to be column vectors (N×1 matrix);
|v| is the magnitude of vector v;
x y=x·y is the dot product of vectors x and y;
x·y is the cross product of vectors x and y;
X y is the matrix multiplication of matrix X and vector y;
$\mathbf{X}^T$ is the matrix transpose;
ŷ is the unit vector in the direction of $$\hat{y} = \frac{y}{\sqrt{y \cdot y}};$$

<$q_0$, v> is the quaternion q with scalar component $q_0$ and the length 3 vector v;
Vector(q)=v where q is the quaternion <$q_0$, v>;
q⊗p is the quaternion multiplication of q and p;
q* is the quaternion conjugate of q: <$q_0$, v>*=<$q_0$, −v>;
$^b$x is the vector x defined in body-frame coordinates;
$^u$x is the vector x defined in user-frame coordinates;
Length 2 vector v is assumed to have subcomponents named ($v_x$, $v_y$); and
Length 3 vector v is assumed to have subcomponents named ($v_x$, $v_y$, $v_z$).

Figure 7:
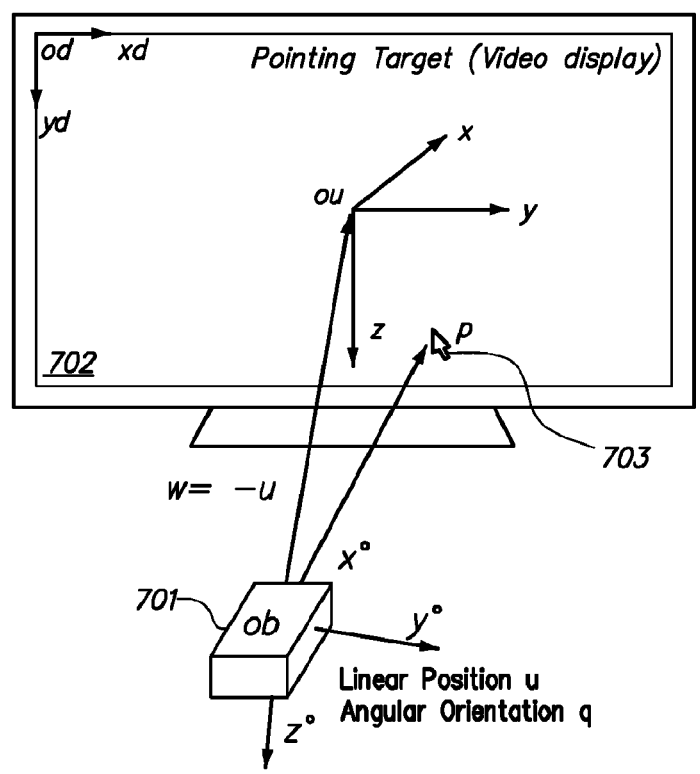
FIG. 7 shows mapping of device motion into displayed cursor motion according to various exemplary embodiments.

Using this notation, exemplary techniques for processing device motion into cursor movement as shown in FIG. 7 will now be considered. The figure shows two coordinate systems. A first coordinate system, i.e., the user-frame coordinate system, is arbitrarily chosen in this example to be the center of the display and consists of (x, y, z). The user-frame coordinate system is stationary with respect to the display. The coordinate system has x into the display, y to the right of the display and z down, which corresponds to a typical aerospace coordinate system convention. Those skilled in the art will recognize that alternate conventions could be used instead and include, for example, PC display coordinates (x right, y down, z into display) and HID (x out of display, y right, z down). For this discussion, the user-frame axes will be arbitrarily defined as:
$^u$x=x=[1, 0, 0]
$^u$y=[0, 1, 0]
$^u$z=[0, 0, 1]
One skilled in the art will recognize that the user-frame coordinate system axes and origin can be chosen without materially altering the present invention. The discussion above assumes a Cartesian coordinate system, but other coordinate systems, such as spherical coordinates, could also be used without affecting the invention.

The second coordinate system in this exemplary embodiment is the device's body-frame coordinate system. The body-frame coordinate system is stationary with respect to the device. The body-frame origin is typically at the center of the device, although that is not required. The body-frame axes are shown as (x°, y°, z°) with x° out the front of the device, y° to the right, and z° down. For this discussion, the body-frame axes are arbitrarily defined as:
$^b$x°=[1, 0, 0]
$_b$y°=[0, 1, 0]
$^b$z°=[0, 0, 1]
One skilled in the art will recognize that the body-frame coordinate system axes and origin can be chosen without materially altering the present invention. The discussion above assumes a Cartesian coordinate system, but other coordinate systems, such as spherical coordinates, could also be used without affecting the invention.

The length 3 vector ou is the origin of the user-frame coordinate system and is defined to be fixed to the display. $^u$ou is defined as (0, 0, 0) for the present embodiment. The length 3 vector ob is the origin of the body-frame coordinate system and is defined to be fixed to the device, $^b$ob is defined as (0, 0, 0) for the present embodiment. The length 3 vector od is the origin of the display coordinate system and is defined to be fixed to the display. $^u$od is defined as (0, $c_x$, $c_y$) for the present embodiment. The length 3 vector u is defined as the device's linear position in 3-D space. u=ob. The length 3 vector w is the vector from the device's body-frame coordinate system origin, ob, to the user-frame coordinate system origin, ou. Mathematically, w=ou−ob=−u.

The quaternion q is defined as the device's angular position with respect to user-frame coordinates. For the present discussion, q is defined as a unit quaternion (q·q=1). Instead of quaternions, any desired alternate angular position representation could also be used including, for example, Euler angles, direction cosine matrix (DCM), and vector/angle. The length 2 vector p is the pointing device's cursor location on the display given as 2-D display coordinates. The length 2 vector $p_0$ is the cursor location of the display coordinate system. The length 3 vector ω is the angular velocity. Following the convention above, $^u$ω is the angular velocity in user-frame coordinates and $^b$ω is the angular velocity in the device's body-frame coordinates. Given a vector in body-frame coordinates, the vector in user-frame coordinates can be found using the following equation:

$$^u v = \text{Vector}(q \otimes \langle 0, ^b v \rangle \otimes q^*)$$

Given a vector in user-frame coordinates, the vector in body-frame coordinates with the following equation:

$$^b v = \text{Vector}(q^* \otimes \langle 0, ^u v \rangle \otimes q)$$

Given this exemplary, mathematical context, mapping device motion into cursor location using absolute pointing will first be considered. The cursor in an absolute pointing system should be located at the intersection of the display and the line containing the device's x° axis. For example, if a laser pointer were appropriately mounted to the device 701, the cursor location and the laser pointer's dot on the display 702 should at the same position. The full mathematical equation for absolute pointing given user-frame coordinates is:

$$p = \frac{^u u_x}{^u x \Box_x} \begin{bmatrix} ^u x \Box_y \\ ^u x \Box_z \end{bmatrix} + \begin{bmatrix} ^u u_y \\ ^u u_z \end{bmatrix} + p_0$$

Absolute pointing is especially suitable for shooting games where the user aims directly at targets on the display. Absolute pointing is analogous to how humans point our arms, hands and fingers to physical objects in our environment. With absolute pointing, the ratio of cursor motion to angular device motion changes as a function of distance. The further the device is from the display, the smaller the angular motions required to move the cursor a given distance on the display. Likewise, the further the device is from the x axis, the smaller the angular motions required to move the cursor. Thus, for example, an absolute pointing algorithm maps device motion to cursor location based upon an intersection of a forward pointing direction (body-frame x-axis) of the device and a surface of a display on which the cursor is to be displayed.

The value of $^u u_x$ corresponds to a distance correction factor. This distance correction factor is described by U.S.

Pat. No. 5,627,565 entitled "Space coordinates detecting device and input apparatus using same", the disclosure of which is incorporated here by reference.

Next, relative pointing or "body-frame" relative pointing will be considered. Some applications do not required direct pointing at a display or may not have any meaningful frame of reference. For such cases, the application may choose to use the device itself as the primary reference. As long as the $^u x^o{}_x$ is positive, regardless of the position of the display or the position of the device, if the user moves the device linearly along the $y^o$ axis or rotates around the $z^o$ axis, the cursor will always move to the right.

Assuming discrete time with Euler integration, body-frame relative pointing is mathematically defined by:

$$\Delta p = \begin{bmatrix} {}^b\omega_z \\ -{}^b\omega_y \end{bmatrix} \Delta t - \begin{bmatrix} \Delta^b ou_y \\ \Delta^b ou_z \end{bmatrix}$$

Note that devices need not implement both terms in this equation. Relative pointing is illustrated functionally in FIG. 8. With relative pointing, unlike absolute pointing, the amount of cursor motion is not affected by the position of the device 800. However, the forward direction of the device and the cursor location are not deterministic and may vary over time. For some applications, this decoupling is beneficial. The actual cursor location may be computed using a non-linear function of $\Delta p$, referred to as vPointer in FIG. 8, which is a non-linear function often called pointer ballistics 802. Traditional 2-D computer mice use pointer ballistics 802 to improve their apparent usability and performance, and this function can also be used in 3D pointer mapping. The output of the pointer ballistics 802, vSys, is then used to move the cursor on screen subject to boundary conditions, etc., in block 804.

Although body-frame relative pointing offers some advantages, users often do not care about the position of the device, only the relative movements that they make. Thus, a third type of mapping which is considered here is referred to as "user-frame relative pointing". In user-frame relative pointing, if the user rotates the device around the user-frame z-axis then the cursor should move to the right. If the user linearly moves the device along the user-frame z-axis, then the cursor should move down.

Assuming discrete time with Euler integration, user-frame relative pointing is mathematically defined by:

$$^bz = \text{Vector}(q^* \otimes \langle 0, {}^u z \rangle \otimes q)$$

$$\theta = \tan^{-1}\left(\frac{{}^b z_y}{{}^b z_z}\right)$$

$$\Delta p = \begin{bmatrix} \cos\theta & \sin\theta \\ -\sin\theta & \cos\theta \end{bmatrix} \begin{bmatrix} {}^b\omega_z \\ -{}^b\omega_y \end{bmatrix} \Delta t - \begin{bmatrix} \Delta^b ou_y \\ \Delta^b ou_z \end{bmatrix}$$

Note that the device need not implement both terms. U.S. Pat. No. 7,158,118, the disclosure of which is incorporated by reference above, contains details and disclosures regarding user-frame relative pointing. In one exemplary embodiment described therein, $-^b z$ is measured by an accelerometer. As with body frame relative pointing, with user frame relative pointing the amount of cursor motion is not affected by the position of the device. However, the forward direction of the device and the cursor location are not deterministic and may vary over time. For some applications, this decoupling is beneficial. The actual cursor location may be computed using a non-linear function of $\Delta p$, often called pointer ballistics. Traditional 2-D computer mice use pointer ballistics to improve their apparent usability and performance.

For many applications, the device responsiveness should be constant regardless of its position within the room but should still be pointing towards the display. According to exemplary embodiments, a fourth mapping technique, referred to herein as "absolute invariant pointing" blends many of the relative pointing benefits with the absolute pointing benefits while minimizing the negative factors of each method. Absolute invariant pointing can be mathematically defined by:

$$^u\dot{x} = \text{Vector}(q \otimes \langle 0, {}^b\dot{x} \rangle \otimes q^*)$$

$$p = c\begin{bmatrix} \tan^{-1}\frac{{}^u\dot{x}_y}{{}^u\dot{x}_x} \\ \tan^{-1}\frac{{}^u\dot{x}_z}{{}^u\dot{x}_x} \end{bmatrix} + \begin{bmatrix} {}^u u_y \\ {}^u u_z \end{bmatrix} + p_0 \approx c\begin{bmatrix} \sin^{-1}{}^u\dot{x}_y \\ \sin^{-1}{}^u\dot{x}_z \end{bmatrix} + \begin{bmatrix} {}^u u_y \\ {}^u u_z \end{bmatrix} + p_0$$

where c is a constant.

Absolute invariant pointing, like absolute pointing per se described above, contains a direct, repeatable mapping from device linear position and angular position into cursor location. At the same time, the cursor responsiveness to linear motion and angular motion is consistent over the motion range. If the device is located to the left or right of display center, then users typically attempt to move the device left or right relative to the vector from the device to the display, not the display normal vector, x. This results in an apparent loss of linear motion resolution as the device moves away from the x-axis. Thus, an absolute invariant mapping algorithm according to this exemplary embodiment generates cursor position as a sum of a term of linear position values and a term computed from angular position that is independent of linear position.

A fifth mapping technique called "virtual display" reduces the loss of apparent linear resolution found with "absolute invariant pointing" as the device moves off-axis. The "virtual display" technique may create an intermediate, virtual display that moves to face the device. By moving to face the device, the virtual display maintains the same resolution as if the device was directly in front of the display. A full virtual display moves to directly face the device. A new virtual display coordinate system is created by construction with axes $x^\Delta$, $y^\Delta$, and $z^\Delta$. In mathematical terms, $$^u x^\Delta = -^u \hat{u}$$

Typically, the new coordinate system will preferably, but not as a requirement, maintain the y-axis as "horizontal" and the z-axis as "vertical". By construction, the remaining axes will then be:

$$b = {}^u z \times {}^u x^\Delta$$

$$^u y^\Delta = \hat{b}$$

$$^u z^\Delta = {}^u x^\Delta \times {}^u y^\Delta$$

By fully rotating the virtual display to face the device, the cursor response becomes highly non-linear as the device points away from the origin. To help minimize these effects, the virtual display coordinate system need not fully rotate towards the device. A scaling factor can be applied to construct $^u x^\Delta$ between $^u x$ and $^u \hat{u}$. For example, $$^u x^\Delta = c^u x - (1-c)^u \hat{u}$$

where c is a value between 0 and 1, inclusive.

The virtual display can be applied to the absolute pointing algorithm to create a planar virtual display:

$$Q = \begin{bmatrix} | & | & | \\ {}^u x^\Delta & {}^u y^\Delta & {}^u z^\Delta \\ | & | & | \end{bmatrix}^T$$

$$s = Q {}^u \hat{x}_i$$

$$w = Q {}^u u$$

$$p = \frac{w_x}{s_x}\begin{bmatrix} s_y \\ s_z \end{bmatrix} + \begin{bmatrix} w_y \\ w_z \end{bmatrix} + p_0$$

The virtual display method can also be applied to any absolute or pseudo-absolute mapping method including the absolute pointing and absolute invariant pointing described above. If the cursor resides on a non-planar display, then this method could easily be adapted to create a virtual display of the non-planar display. Thus, according to exemplary embodiments, the intermediate, planar virtual display maps device motion to cursor location based upon an intersection of a forward pointing direction (body-frame x-axis) of the device and a surface of a display on which the cursor is to be displayed rotated to at least partially face the device.

For many applications, angular response is more important than linear response. However, the virtual display method does not have consistent angular response. The angular responsiveness is similar to absolute pointing, not relative pointing.

A sixth mapping technique called "virtual spherical display" maintains constant angular response, unlike the "virtual display". For example, if a conversion to polar coordinates is first performed, i.e.:

$$b = Q {}^u \hat{x}_i = \begin{bmatrix} \cos\phi\cos\theta \\ \cos\phi\sin\theta \\ -\sin\phi \end{bmatrix}$$

Then, the algorithm can solve for $\theta$ and $\varphi$ and finally p using homogenous coordinates as follows:

$$\phi = \sin^{-1}(-b_z)$$

$$\theta = \tan^{-1}\left(\frac{b_y}{b_x}\right)$$

$$\begin{bmatrix} p_x \\ p_y \\ 1 \end{bmatrix} = T \begin{bmatrix} \theta \\ -\phi \\ 1 \end{bmatrix}$$

where T is a 3×3 general transformation matrix of arbitrary constants. The matrix T may apply any combination of a scale, rotation, translation, shearing, reflection, orthogonal projection, affine transformation or perspective projection. Thus, the spherical virtual display according to this exemplary embodiment maps device motion to cursor location based upon spherical coordinates of the estimated angular position being transformed into the virtual display coordinates by a transformation matrix and converted into cursor location.

The spherical virtual display method can be applied to relative pointing to create a seventh mapping technique called "relative spherical virtual display". Instead of controlling the cursor using angles, this method uses the change in the angle to drive a change in the cursor.

$$\begin{bmatrix} \Delta p_x \\ \Delta p_y \\ 1 \end{bmatrix} = T \begin{bmatrix} {}^u\omega_z \Delta t \\ -{}^u\omega_y \Delta t \\ 1 \end{bmatrix}$$

where T is a 3×3 general transformation matrix of arbitrary constants. The matrix T may apply any combination of a scale, rotation, translation, shearing, reflection, orthogonal projection, affine transformation or perspective projection. Thus, the intermediate, relative, spherical virtual display according to this exemplary embodiment play maps device motion to cursor location based upon body-frame angular velocity modified by a transformation matrix and converted into cursor change in location.

The angular position can also be mapped into cursor coordinates using a spherical projection. This eighth mapping method is known as "angular position spherical projection".

$$b = q_I^* \otimes q^* \otimes {}^u\hat{x}_i \otimes q \otimes q_I = \begin{bmatrix} \cos\phi\cos\theta \\ \cos\phi\sin\theta \\ -\sin\phi \end{bmatrix}$$

where $q_I$ is an arbitrary initial angular position rotation value. Then, the algorithm can solve for $\theta$ and $\varphi$ and finally p using homogenous coordinates as follows:

$$\phi = \sin^{-1}(-b_z)$$

$$\theta = \tan^{-1}\left(\frac{b_y}{b_x}\right)$$

$$\begin{bmatrix} p_x \\ p_y \\ 1 \end{bmatrix} = T \begin{bmatrix} \theta \\ -\phi \\ 1 \end{bmatrix}$$

where T is a 3×3 general transformation matrix of arbitrary constants. The matrix T may apply any combination of a scale, rotation, translation, shearing, reflection, orthogonal projection, affine transformation or perspective projection. One skilled in the art will note that if the third row of p in homogenous coordinates is not equal to one, then p can be scaled so that it becomes one.

The outputs of all or some of the absolute methods described above can be joined by simple linear combination or a more complicated non-linear combination. For example, suppose that an application wanted to be mostly absolute but with improved angular resolution pointing consistency. In this case, a combination of the above described "absolute pointing mapping" with the "invariant absolute pointing mapping" can be performed. Exemplary embodiments can, for example, use a simple linear combination (or a more complicated non-linear process) to combine any two more of the described methods. For each method, $p_i$, an application assigns a weighting factor $c_i$. The final resulting p is then:

$$p = \sum_i c_i p_i$$

Ideally, $$\sum_i c_i = 1$$

to maintain a consistent cursor response, but this constraint is not required.

Similarly, the outputs of all or some of the relative methods described above can be joined by simple linear combination or a more complicated non-linear combination. For example, suppose that both the angular position and angular velocity of a device had unique flaws. An embodiment could use an equal linear combination of "user-frame relative pointing" with "relative spherical virtual display" which would reduce the flaws of each method by half. The exemplary embodiment uses a simple linear combination to combine the methods. For each method, $p_i$, an application assigns a weighting factor $c_i$. The final resulting $\Delta p$ is then:

$$\Delta p = \sum_i c_i \Delta p_i$$

Ideally, $$\sum_i c_i = 1$$

to maintain a consistent cursor response, but this constraint is not required.

Combining absolute pointing methods and relative pointing methods is also considered according to these exemplary embodiments. One method in which combined absolute and relative pointing mappings can be employed is to have the cursor primarily controlled through relative pointing, but use absolute pointing to adjust the cursor movement so as to avoid long-term drift from the reference. Avoiding long-term drift would eliminate the periodical re-centering the cursor typical with relative pointing solutions. When using relative pointing and when using non-linear pointer ballistics according to an exemplary embodiment, the mapping between 3D pointer position and cursor position is time-varying and dependent upon the position and range of motion, and also the speed of movement. By retaining history of 3D pointer positions and their associated cursor locations, it is possible to define an adaptive map that defines a cursor position based upon a 3D pointer position. This map can be constrained to minimize the difference between the history of cursor positions and the history of 3D pointer positions mapped to cursor positions with the map.

Figure 10:
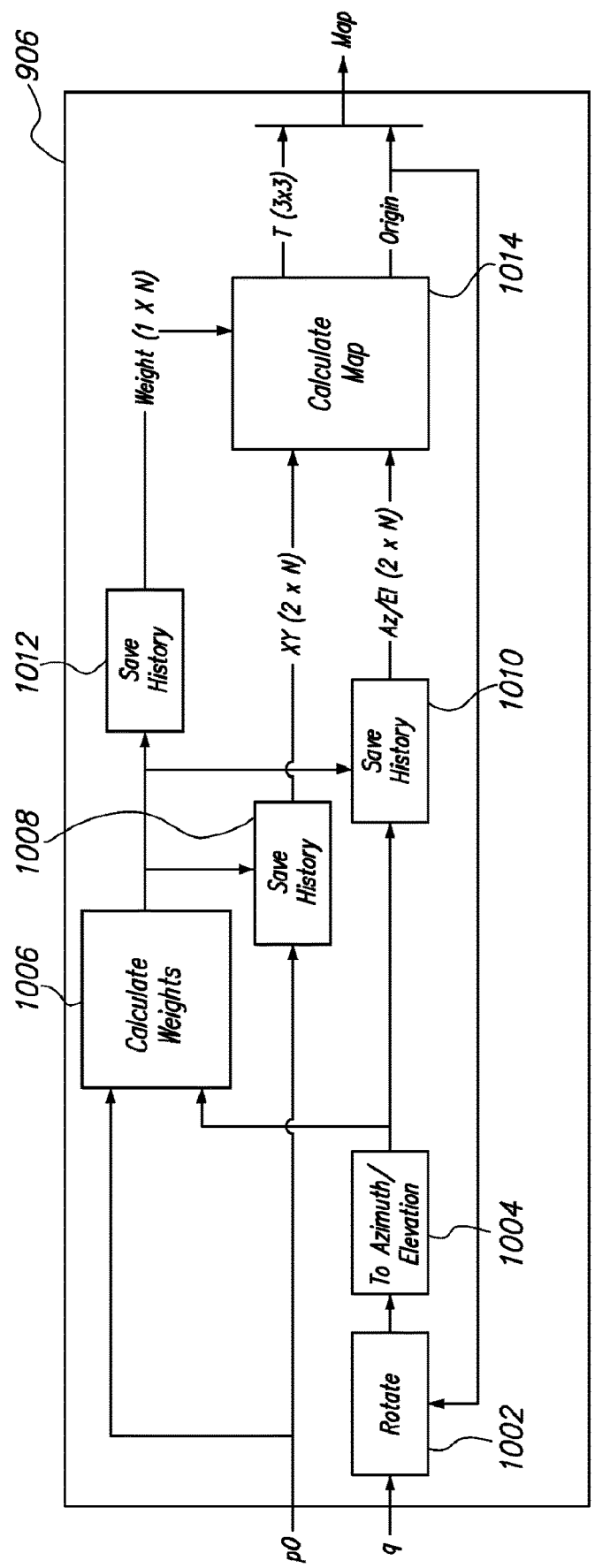

An example of such an embodiment is illustrated in FIG. 9. In this particular exemplary embodiment, the "user-frame relative pointing" mapping is combined with the "angular position spherical projection", both of which mappings are individually described above. The pointing device 900 outputs, on the lower branch 902, vPointer data which is the user-frame relative pointing data described above with respect to FIG. 8. On the upper branch 904, the pointing device 900 outputs angular position which is used by the absolute pointing mapping algorithm as an input. A map is created in block 906 which, in this exemplary embodiment, includes a 3×3 general transformation matrix T which can perform a variety of transformations on the output angular position, e.g., scale (stretch in any of the axes), rotation (preserve orthogonality), shearing (essentially make axes non-orthogonal), translation (offset to account for 2D application of data), reflection, and any other affine transformation or perspective projection. The map also defines an origin value (quaternion). A detailed example of how the map can be created is shown in FIG. 10.

Therein, in block 1002, the angular position output from the device is first rotated to map the measured angular position of the device to account for deviations from the nominal origin. After applying the initial rotation, the angular position is converted to spherical coordinates at block 1004. The current sample is evaluated to determine a weight for the sample at block 1006. The weights capture how important each previous point is to defining the current map between where the cursor is currently located on the screen and the angular position of the pointing device 900. The weights assist with determining which data points are worth saving and can be used as part of the least squares solution to find the map. In the exemplary implementation, the primary weight is applied to each sample based upon the absolute angular position of the pointing device. The full range of motion of the device is divided into a fixed set of small regions. The first data point in each region gets the largest weight, and every future point within that region gets a smaller weight. In addition a secondary weight based on the current angular velocity is applied so that points where the device is at rest are more important than for points where the device is in motion. Based on this weight, the best N samples of cursor position, angular position, and weighted samples are saved and used for map calculation at blocks 1008, 1010 and 1012, respectively. The map is created at block 1014 by first calculating the rotation origin to ensure that the input data remains within a reasonable range for conversion to spherical coordinates. If the cursor has moved beyond the display bounds, the origin and the saved state can be adjusted to define a new alignment. Next a 3×3 general transformation matrix T is created that will transform the set of azimuth/elevation pairs onto the set of cursor positions. One method of finding T is to define the error vector $v_n$ for each of the N saved samples as:

$$v_n = T \begin{bmatrix} \theta_n \\ -\phi_n \\ 1 \end{bmatrix} - \begin{bmatrix} x_n \\ y_n \\ 1 \end{bmatrix}$$

and then minimize the least squares error $$\underset{T}{\operatorname{argmin}} \left[ \sum_{n=1}^{N} w_n (v_n \cdot v_n) \right]$$

where $w_n$ is the weight for each sample. One skilled in the art will recognize that many methods exist for finding a solution to this linear least squares problem including inverting the normal equations using the Moore-Penrose pseudo-inverse and orthogonal decomposition methods such as QR decomposition or singular value decomposition. QR decomposition is used in the exemplary implementation.

Figure 11:
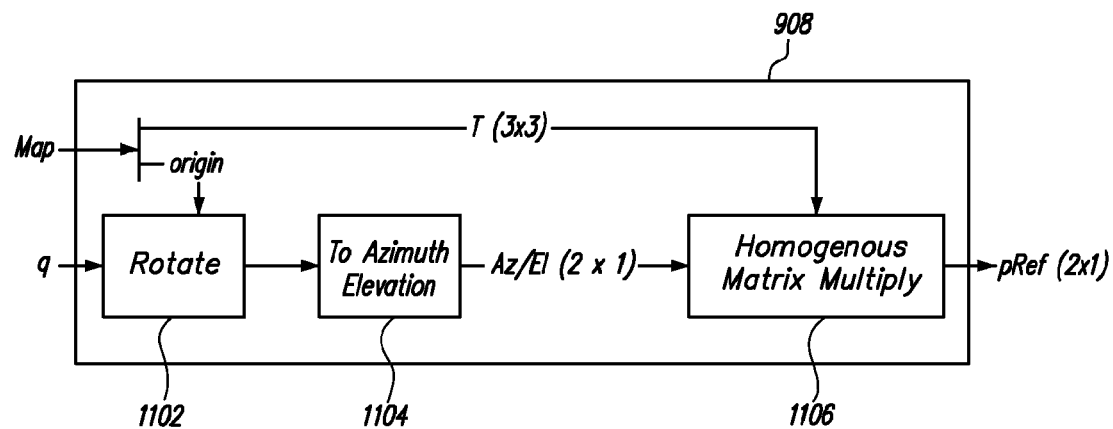

Returning to FIG. 9, once a map is defined by block 906 it is used to map the current 3D pointer position to display coordinates to generate a reference cursor location pRef in block 908. More details regarding this exemplary process are illustrated in FIG. 11. Therein, at block 1102, the angular position of the device 900 is rotated in the same way as described above with respect to block 1002, and the output is translated into spherical coordinates by block 1104 to create the 2×1 vector called Az/El. This is then converted to homogenous coordinates and then multiplied with the map matrix T at block 1106 yielding pRef. The pRef value thus represents the desired location for the cursor based upon the absolute pointing system component of this exemplary, combined mapping.

Figure 12:
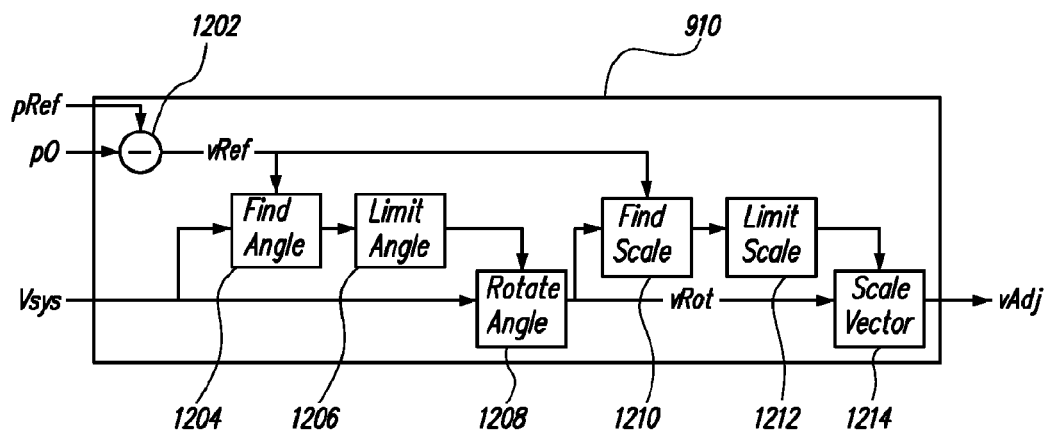

Returning again to FIG. 9, the relative pointing value vSys, the absolute pointing value pRef and the current cursor position p0, are input to a dynamic ballistics function 910. The dynamic ballistics function 910 takes these inputs and, in this exemplary embodiment, uses the absolute pointing value and the current cursor position to adjust the relative pointing value. More specifically, as shown in FIG. 12, the current and reference cursor positions are used to adjust the cursor movement before it is applied to the cursor. One method of adjusting the cursor is to perform small adjustments to the scale and angle of the current velocity vector so that the new cursor position will be closer to the reference point. First, the current point is subtracted from the reference point to get the reference velocity vector vRef at block 1202. This reference vector is compared to the original velocity v0 to find the angle between the vectors at block 1204. This angle is limited to a fixed maximum, at block 1206, and then used to rotate the vector v0 to create vRot as shown in block 1208 of FIG. 12. Next, the reference vector is projected onto vRot to find the scaling of vRot that would get the next point closest to the reference point as shown in block 1210. This scaling is limited between a maximum and minimum value (block 1212) and then applied to vRot at block 1214. The limits on maximum angle and maximum scale can be tuned to control how much correction will be applied.

By combining absolute pointing methods and relative pointing methods it is possible to maintain the benefits of relative pointing but still maintain a fixed region of 3D device positions that map to the display. This allows for drift-less relative pointing, which has the invariant that given a 3D pointer position q and cursor location p1 at time t0, returning the device to position q at time $t_1 > t_0$ will return the cursor location to p2 such that $p1 \approx p2$.

Numerous variants and alternatives of the foregoing mapping techniques are contemplated. For example, the combination need not be limited to full mapping methods. Each term of each mapping method could be assigned its own weighting factor. Moreover, the virtual display need not fully track the device. Compromises include:
1. Adding (or subtracting) an arbitrary x-axis value to the actual device position to appropriately scale linear motion.
2. Algorithmically increasing or decreasing the distance to the virtual display from the device.
3. Multiplying the device's actual position by a scale factor to reduce or increase the response to linear motion.
4. A combination of any of the above factors.

Alternative virtual display surfaces could be used. The above text describes planes and spheres, but the virtual display could be extended to cylinders, ellipses and higher order surfaces.

Figure 13:
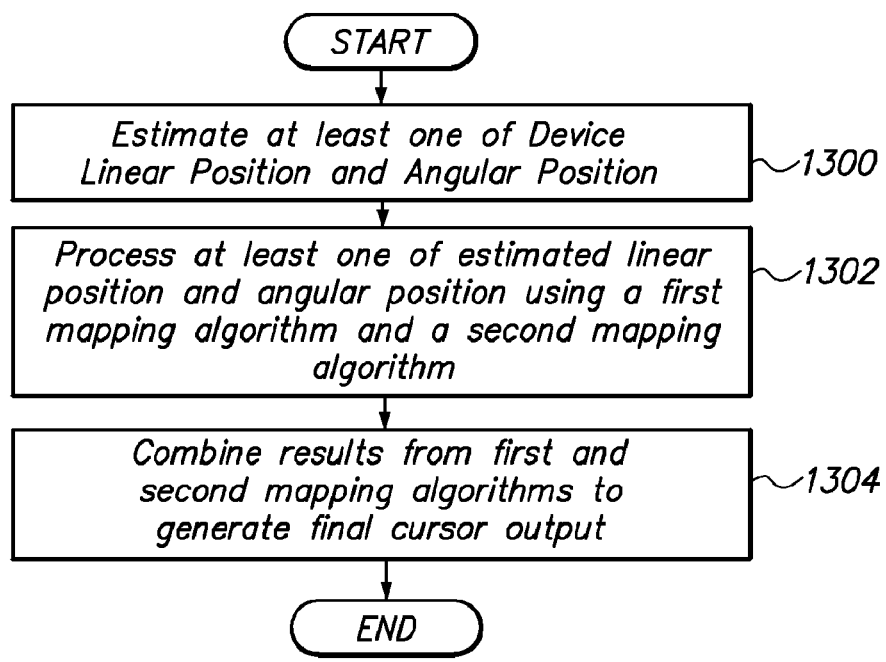
FIG. 13 is a flowchart illustrating a method for mapping a device's movement into cursor position according to an exemplary embodiment.

Thus according to one exemplary embodiment, a method for mapping a device's movement into cursor position can include the steps illustrated in the flowchart of FIG. 13. Therein, at step 1300, at least one of a 3D pointing device's linear position and angular position can be estimated (or sensed, measured, detected, etc.). In some cases, exemplary mapping algorithms described above may use only a device's linear position, only a device's angular position or both its linear position and angular position as inputs to the mapping algorithms. Then, at step 1302, at least one of the estimated linear position and estimated angular position are processed using both a first mapping algorithm, to generate a first cursor location, and a second mapping algorithm, to generate a second cursor location. The results are combined at step 1304 to generate a final cursor output.

The mapping algorithms may operate on partial or incomplete motion data. For example, user-frame relative pointing is useful with only one of the two terms. Some applications can utilize user-frame relative pointing while collecting either angular motion or linear motion, but not both. Sensor(s) may collect and estimate motion in either user-frame coordinates, body-frame coordinates or a combination of user-frame and body-frame coordinates. The mapping algorithm may operate in either the body-frame coordinate system, user-frame coordinate system, or any other coordinate system. Motion may be measured in any coordinate system including Cartesian and spherical. The mapping algorithm may use derivatives of linear position including velocity and acceleration. The mapping algorithm may use derivatives of angular position including velocity and acceleration. The mapping combination method may be trivial and only use data from one mapping method. The factors for other algorithms may be 0. Mathematical terms with 0 valued coefficients need not be computed or appear in the final implementation.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a 3D pointing device or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the pointer mapping as described above. According to other exemplary embodiments, some of the processing described above with respect to pointer mapping may be performed in the device containing the sensors, while the remainder of the processing is performed in a second device after receipt of the partially processed data from the device containing the sensors.

Although the foregoing exemplary embodiments relate to sensing packages including one or more rotational sensors and an accelerometer, pointer mapping techniques according to these exemplary embodiments are not limited to only these types of sensors. Instead pointer mapping techniques as described herein can be applied to devices which include, for example, only accelerometer(s), optical and inertial sensors (e.g., a rotational sensor, a gyroscope, an angular velocity sensor or a linear accelerometer), a magnetometer and an inertial sensor (e.g., a rotational sensor, a gyroscope or a linear accelerometer), a magnetometer and an optical sensor, or other sensor combinations. Additionally, although exemplary embodiments described herein relate to cursor mapping in the context of 3D pointing devices and applications, such techniques are not so limited and may be employed in methods and devices associated with other applications, e.g., medical applications, gaming, cameras, military applications, etc.

The above-described exemplary embodiments are intended to be illustrative in all respects, rather than restrictive, of the present invention. Thus, the present invention is capable of many variations in detailed implementation that can be derived from the description contained herein by a person skilled in the art. For example, although the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for mapping a device's movement into cursor position, comprising:
    estimating the device's pose in any one of three to six degrees of freedom;
    processing the estimated pose using (i) a first mapping algorithm to generate a velocity vector and (ii) a second mapping algorithm to generate a first cursor position;
    determining an adjusted velocity vector, at least in part, by adjusting any of a scale and an angle of the velocity vector to cause a second cursor position resulting from a combination of a current cursor position and the adjusted velocity vector to be closer to the first cursor position than a third cursor position resulting from a combination of the current cursor position and the velocity vector; and
    combining the current cursor position with the adjusted velocity vector to generate a final cursor output.

2. The method of claim 1, wherein the first mapping algorithm comprises a relative pointing algorithm, and wherein the second mapping algorithm comprises an absolute pointing algorithm.

3. The method of claim 2, wherein the relative pointing algorithm is a user-frame relative pointing algorithm.

4. The method of claim 1, wherein adjusting any of a scale and an angle of the velocity vector comprises:
    adjusting any of the scale and the angle of the velocity vector so as to satisfy any of (i) a limit for an acceptable deviation from a characteristic of the first mapping algorithm and (ii) a limit for an acceptable deviation from a characteristic of the second mapping algorithm.

5. The method of claim 4, wherein the characteristic of the first mapping algorithm is that cursor responsiveness to any of linear motion and angular motion is consistent over a motion range, and wherein the characteristic of the second mapping algorithm is long-term drift avoidance.

6. The method of claim 1, wherein adjusting any of a scale and an angle of the velocity vector comprises at least one of:
    adjusting the scale of the velocity vector so as to satisfy any of first minimum value, a first and second maximum value and a first combined minimum and maximum values; and
    adjusting the angle of the velocity vector so as to satisfy any of a second minimum value, a second maximum value and a second combined minimum and maximum values.

7. The method of claim 1, wherein the second mapping algorithms maps the estimated angular position into cursor coordinates using an angular position spherical projection.

8. The method of claim 7, wherein the mapping is performed without using an estimated linear position of the device.

9. The method of claim 1, wherein estimating the device's angular position is based on at least one output from at least one sensor.

10. An apparatus comprising:
    at least one sensor configured to generate an output associated with movement of a device; and
    a processor configured to:
        estimate the device's pose in any one of three to six degrees of freedom;
        process the estimated pose using (i) a first mapping algorithm to generate a velocity vector and (ii) a second mapping algorithm to generate a first cursor position;
        determine an adjusted velocity vector, at least in part, by adjusting any of a scale and an angle of the velocity vector to cause a second cursor position resulting from a combination of a current cursor position and the adjusted velocity vector to be closer to the first cursor position than a third cursor position resulting from a combination of the current cursor position and the velocity vector; and
        combine the current cursor position with the adjusted velocity vector to generate a final cursor output.

11. The apparatus of claim 10, wherein the first mapping algorithm comprises a relative pointing algorithm, and wherein the second mapping algorithm comprises an absolute pointing algorithm.

12. The apparatus of claim 11, wherein the relative pointing algorithm is a user-frame relative pointing algorithm.

13. The apparatus of claim 10, wherein the processor is configured to adjust any of a scale and an angle of the velocity vector, at least in part, by:
    adjusting any of the scale and the angle of the velocity vector so as to satisfy any of (i) a limit for an acceptable deviation from a characteristic of the first mapping algorithm and (ii) a limit for an acceptable deviation from a characteristic of the second mapping algorithm.

14. The apparatus of claim 13, wherein the characteristic of the first mapping algorithm is that cursor responsiveness to any of linear motion and angular motion is consistent over a motion range, and wherein the characteristic of the second mapping algorithm is long-term drift avoidance.

15. The apparatus of claim 10, wherein the processor is configured to adjust any of a scale and an angle of the velocity vector, at least in part, by at least one of:

adjusting the scale of the velocity vector so as to satisfy any of first minimum value, a first and second maximum value and a first combined minimum and maximum values; and adjusting the angle of the velocity vector so as to satisfy any of a second minimum value, a second maximum value and a second combined minimum and maximum values.

16. The apparatus of claim 10, wherein the second mapping algorithms maps the estimated angular position into cursor coordinates using an angular position spherical projection.

17. The apparatus of claim 16, wherein the processor is configured to perform the mapping without using an estimated linear position of the device.

18. An apparatus comprising:
at input configured to obtain an estimated pose of a device in any one of three to six degrees of freedom; and
a processor configured to:
process the estimated pose using (i) a first mapping algorithm to generate a velocity vector and (ii) a second mapping algorithm to generate a first cursor position;
determine an adjusted velocity vector, at least in part, by adjusting any of a scale and an angle of the velocity vector to cause a second cursor position resulting from a combination of a current cursor position and the adjusted velocity vector to be closer to the first cursor position than a third cursor position resulting from a combination of the current cursor position and the velocity vector; and
combine the current cursor position with the adjusted velocity vector to generate a final cursor output.

19. The apparatus of claim 18, wherein the first mapping algorithm comprises a relative pointing algorithm, and wherein the second mapping algorithm comprises an absolute pointing algorithm.

20. The apparatus of claim 18, wherein the processor is configured to adjust any of a scale and an angle of the velocity vector, at least in part, by at least one of:
adjusting the scale of the velocity vector so as to satisfy any of first minimum value, a first and second maximum value and a first combined minimum and maximum values; and
adjusting the angle of the velocity vector so as to satisfy any of a second minimum value, a second maximum value and a second combined minimum and maximum values.

* * * * *